United States Patent
Kim et al.

(10) Patent No.: US 9,597,856 B2
(45) Date of Patent: Mar. 21, 2017

(54) LIGHT-WEIGHT, MULTI-LAYERED COMPOSITE SUBSTRATE AND METHOD OF MAKING THE SAME

(71) Applicant: HANIL E-HWA CO., LTD., Seoul (KR)

(72) Inventors: Ki-Sung Kim, Asan-si (KR); Sung-Ho Park, Asan-si (KR)

(73) Assignee: HANIL E-HWA CO., LTD., Seoul (KR)

( * ) Notice: Subject to any disclaimer, the term of this patent is extended or adjusted under 35 U.S.C. 154(b) by 139 days.

(21) Appl. No.: 14/555,999

(22) Filed: Nov. 28, 2014

(65) Prior Publication Data

US 2015/0158270 A1 Jun. 11, 2015

(30) Foreign Application Priority Data

Dec. 5, 2013 (KR) .................. 10-2013-0150727

(51) Int. Cl.
*B32B 5/18* (2006.01)
*B32B 5/24* (2006.01)
(Continued)

(52) U.S. Cl.
CPC ............... *B32B 5/245* (2013.01); *B32B 5/00* (2013.01); *B32B 5/02* (2013.01); *B32B 5/08* (2013.01); *B32B 5/14* (2013.01); *B32B 5/18* (2013.01); *B32B 5/22* (2013.01); *B32B 5/24* (2013.01); *B32B 5/26* (2013.01); *B32B 7/00* (2013.01); *B32B 7/02* (2013.01); *B32B 7/04* (2013.01);
(Continued)

(58) Field of Classification Search
CPC ........................................................ B32B 5/18
USPC .................................................. 156/148, 181
See application file for complete search history.

(56) References Cited

U.S. PATENT DOCUMENTS 6,030,907 A   2/2000   Ito et al.
6,871,898 B2  3/2005   Jarrard et al.
(Continued)

FOREIGN PATENT DOCUMENTS

JP    H09216303 A    8/1997
JP    2001232708 A   8/2001
(Continued)

*Primary Examiner* — Jeff Aftergut
(74) *Attorney, Agent, or Firm* — William Park & Associates Ltd.

(57) ABSTRACT

A lightweight, multi-layered composite substrate for a vehicle interior material and a method for manufacturing the same are disclosed. A method for manufacturing a lightweight, multi-layered composite substrate including a core layer being a foam sheet and reinforcement layers stacked on both surfaces of the core layer includes preparing the foam sheet, forming each of the reinforcement layers by forming a low-density reinforcement sheet by mixing a natural fiber with a synthetic fiber by carding, subjecting the mixed natural fiber and synthetic fiber to cross wrapping and needle punching, coating polyolefin-based powder to a weight per unit area of 10 g/m² to 100 g/m² on the low-density reinforcement sheet, and pressing the low-density reinforcement sheet by a heat roller set to 150 to 230° C., and obtaining a multi-layered composite substrate by stacking the reinforcement layers on both surfaces of the foam sheet by heat.

15 Claims, 2 Drawing Sheets

(51) Int. Cl.
| | |
|---|---|
| B32B 5/00 | (2006.01) |
| B32B 5/02 | (2006.01) |
| B32B 5/08 | (2006.01) |
| B32B 5/14 | (2006.01) |
| B32B 5/22 | (2006.01) |
| B32B 5/26 | (2006.01) |
| B32B 7/00 | (2006.01) |
| B32B 7/02 | (2006.01) |
| B32B 7/04 | (2006.01) |
| B32B 7/08 | (2006.01) |
| B32B 9/00 | (2006.01) |
| B32B 9/02 | (2006.01) |
| B32B 21/00 | (2006.01) |
| B32B 21/04 | (2006.01) |
| B32B 27/00 | (2006.01) |
| B32B 27/06 | (2006.01) |
| B32B 27/08 | (2006.01) |
| B32B 27/12 | (2006.01) |
| B32B 27/30 | (2006.01) |
| B32B 27/32 | (2006.01) |
| B32B 27/34 | (2006.01) |
| B32B 27/36 | (2006.01) |
| B60R 13/02 | (2006.01) |
| B32B 37/18 | (2006.01) |
| B32B 38/04 | (2006.01) |
| B32B 37/04 | (2006.01) |
| B32B 37/12 | (2006.01) |
| B32B 37/00 | (2006.01) |

(52) U.S. Cl.
CPC .............. *B32B 7/08* (2013.01); *B32B 9/00* (2013.01); *B32B 9/02* (2013.01); *B32B 21/00* (2013.01); *B32B 21/04* (2013.01); *B32B 21/047* (2013.01); *B32B 27/00* (2013.01); *B32B 27/06* (2013.01); *B32B 27/065* (2013.01); *B32B 27/08* (2013.01); *B32B 27/12* (2013.01); *B32B 27/30* (2013.01); *B32B 27/308* (2013.01); *B32B 27/32* (2013.01); *B32B 27/34* (2013.01); *B32B 27/36* (2013.01); *B60R 13/02* (2013.01); *B32B 37/04* (2013.01); *B32B 37/12* (2013.01); *B32B 37/182* (2013.01); *B32B 38/04* (2013.01); *B32B 2037/0092* (2013.01); *B32B 2250/00* (2013.01); *B32B 2250/24* (2013.01); *B32B 2250/40* (2013.01); *B32B 2255/00* (2013.01); *B32B 2255/02* (2013.01); *B32B 2255/10* (2013.01); *B32B 2255/26* (2013.01); *B32B 2260/046* (2013.01); *B32B 2262/00* (2013.01); *B32B 2262/02* (2013.01); *B32B 2262/0276* (2013.01); *B32B 2262/0284* (2013.01); *B32B 2262/06* (2013.01); *B32B 2262/14* (2013.01); *B32B 2264/00* (2013.01); *B32B 2264/0257* (2013.01); *B32B 2266/025* (2013.01); *B32B 2305/022* (2013.01); *B32B 2305/08* (2013.01); *B32B 2307/306* (2013.01); *B32B 2307/712* (2013.01); *B32B 2307/718* (2013.01); *B32B 2307/734* (2013.01); *B32B 2317/10* (2013.01); *B32B 2323/10* (2013.01); *B32B 2398/20* (2013.01); *B32B 2605/00* (2013.01); *B32B 2605/003* (2013.01); *Y10T 428/24967* (2015.01)

(56) References Cited

U.S. PATENT DOCUMENTS

| | | | | |
|---|---|---|---|---|
| 2002/0197442 | A1* | 12/2002 | Wyner | B32B 5/24 428/85 |
| 2009/0021055 | A1* | 1/2009 | Kim | B32B 5/18 296/214 |
| 2013/0210309 | A1* | 8/2013 | Kim | B32B 5/18 442/334 |

FOREIGN PATENT DOCUMENTS

| | | |
|---|---|---|
| JP | 2006334906 A | 12/2006 |
| KR | 1020090118878 A | 11/2009 |
| KR | 1020110009409 A | 1/2011 |

* cited by examiner

LIGHT-WEIGHT, MULTI-LAYERED COMPOSITE SUBSTRATE AND METHOD OF MAKING THE SAME

This application claims the benefit of Korean Patent Application No. 2013-0150727, filed on Dec. 5, 2013, which is hereby incorporated by reference as if fully set forth herein.

BACKGROUND OF THE INVENTION

Field of the Invention

The present invention relates to a composite substrate for a vehicle interior material, and more particularly, to a lightweight, multi-layered composite substrate manufactured by stacking a reinforcement layer formed of a natural fabric and a synthetic fabric on each of both surfaces of a thermoplastic foam sheet.

Discussion of the Related Art

A headliner is a vehicle part above the head of a passenger, which has a specific shape and is attached to a steel panel of an upper body of a vehicle. The headliner functions to protect passengers from impacts, shield them from heat, and absorb noise. Such a vehicle interior material is an important part that determines riding comfort. In general, a soft material such as resin or a fabric is used as an interior material.

Along the trend toward relatively large space and part modularization, multiple correlated parts are assembled and attached in a complex structure in the process of manufacturing a vehicle. Thus, shape stability (or dimensional stability) of materials is essential. In other words, materials should not be deformed or delaminated between layers under an ambient environment with various temperatures and humidity levels. Furthermore, due to the recent ecofriendly demands, there is a need for lightweight materials that are highly heat-resistant, strong, and highly energy-efficient.

In general, a composite substrate for a vehicle interior material is formed by stacking a reinforcement layer (or an outer surface layer) that determines a design, absorbs noise, and offers a sense of cushioning on one or both surfaces of a core layer that maintains a shape and mountability.

1) Core Layer

Conventionally, a core layer of a composite substrate for a vehicle interior material is formed of a natural fiber-reinforced board, a resin felt, a wood fiber, polyurethane foam, etc.

Specifically, as a core layer, a sheet fiber structure containing a natural fiber or a synthetic fiber is used in the form of felt for a noise-absorbing or shielding material or in the form of a natural-fiber reinforced board after it is molded into a predetermined shape through heating and molding. The conventional noise-absorbing or shielding material is not dense in structure, thus easily allowing introduction of moisture and being musty. As the noise-absorbing or shielding material is treated with preservatives to suppress decomposition of the natural fiber, generation of germs, and mold growth, toxic substances are produced. Moreover, the noise-absorbing or shielding material is not viable to a field requiring shape stability due to a low density and the resulting low strength. Although the natural fiber-reinforced board is highly strong and stable, it should be fabricated to a weight per unit area of 1200 $g/m^2$. Therefore, the natural fiber-reinforced board is heavy and offers a low sense of cushioning due to its compressed fabrication. As a consequence, the natural fiber-reinforced board has limitations in application as a vehicle interior material.

In another example, the core layer of the conventional composite substrate for a vehicle interior material is formed of a resin felt produced by mixing hemp, cotton, and a synthetic fiber with a thermo-curable phenol resin, a wood fiber obtained by mixing wood powder with phenol resin. Although this material is strong and thus popular as an interior material for a large-sized car, its heavy weight does not help the increase of fuel efficiency, there is a smell inherent to phenol, dust harmful to the human body is generated, and a bad odor is generated from volatilization of an organic solvent during attachment to an outer surface material. As a result, a working environment gets poor and a customer may have headache while using it.

In a further example, if polyurethane foam is used for the core layer, the core layer is not laminated effectively to the reinforcement layer by heat. To laminate the reinforcement layer, an adhesive containing a primer component or a multi-layered adhesive film should be used, which makes a manufacturing process complex and increases cost.

2) Stacking of the Core Layer and the Reinforcement Layer

The composite substrate for a vehicle interior material is manufactured by stacking a mat or film formed of an inorganic fiber such as a glass fiber or a reinforced sheet formed by needle punching between a natural fiber and a synthetic fiber as a reinforcement layer on one or both surfaces of the core layer.

Particularly, reinforced sheets fabricated only by needle-punching a natural fabric and a synthetic fabric are usually stacked on both sides of the core layer in order to make a vehicle interior material lightweight and stable in shape.

However, as a reinforced sheet 202 with a weight per unit area of 300 $g/m^2$ or below is subjected to carding and needle punching during mixing a natural fiber with a synthetic fiber, the reinforced sheet gets non-uniform in thickness and density. As a result, the properties of the composite substrate may be non-uniform and have a low flexural strength. Moreover, if the reinforced sheet 202 is formed to a weight per unit area of 300 $g/m^2$ to make the composite substrate lightweight, the reinforced sheet 202 is very susceptible to elongation along a length direction during lamination to the foam sheet and thus its stability of a dimensional change rate is decreased after molding. If the density uniformness of the reinforced sheet 202 is decreased due to the lightweight of the reinforced sheet 202, the foam sheet is carbonized partially during pre-heating in the molding process.

In addition, the reinforced sheet formed of the natural fiber and the synthetic fiber is expanded by moisture under the condition of high temperature and high humidity and shrunk by drying. Repeated expansion and shrinkage leads to degradation of the properties of the composite substrate and deformation of the composite substrate. Particularly, if the weight of the reinforced sheet is low, it is more vulnerable to moisture. As the reinforced sheet is deformed when it is used as an interior material, there are limitations in making the interior material lightweight. Particularly, when the natural fiber of the reinforced sheet absorbs moisture under a high-temperature, high-humidity condition, the composite substrate is deformed, shrunken, or expanded, which makes it difficult to apply the composite substrate as a product.

If the core layer and the reinforcement layer are heated separately and then attached to each other by pressure during thermal molding, the thickness of the foam is reduced remarkably. As a consequence, the flexural property of the composite substrate is significantly degraded.

SUMMARY OF THE INVENTION

Accordingly, the present invention is directed to a lightweight, multi-layered composite substrate for a vehicle interior material and a method for manufacturing the same that substantially obviate one or more problems due to limitations and disadvantages of the related art.

An object of the present invention is to provide a lightweight, multi-layered composite material that is lightweight and stable for the human body by use of a natural fiber, prevents property degradation caused by moisture absorption, and increases density uniformness, and a method for manufacturing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention provides a method for manufacturing a lightweight, multi-layered composite substrate in which reinforcement layers are stacked on both surfaces of a foam sheet being a core layer, in order to increase density uniformness, humidity-resistance, and strength and thus improve shape stability.

According to the present invention, each of low-density sheets is formed by mixing a natural fiber with a synthetic fiber by carding, cross-wrapping the mixed natural fiber and synthetic fiber both or together with a polyester-based felt, and combining the natural fiber and the synthetic fiber both or together with the polyester-based felt by needle punching. To increase humidity resistance and improve sagging by increasing surface tension, polyolefin-based powder or a polyolefin-based film is applied to the thin sheet. Then, reinforcement layers are formed in the form of continuous high-density thin sheets using the thin sheets by means of a heat roller. A lightweight, multi-layered composite substrate is manufactured by successively stacking the reinforcement layers on both surfaces of a core layer being a polypropylene foam sheet by heat. Therefore, a product with high density uniformness, strength, humidity-resistance, and shape stability may be achieved, compared to a conventional product.

In an aspect of the present invention, a method for manufacturing a lightweight, multi-layered composite substrate including a core layer being a foam sheet and reinforcement layers stacked on both surfaces of the core layer includes preparing the foam sheet, forming each of the reinforcement layers in the form of a continuous high-density thin sheet by forming a low-density reinforcement sheet by mixing a natural fiber with a synthetic fiber by carding, subjecting the mixed natural fiber and synthetic fiber to cross wrapping and needle punching or cross-wrapping the mixed natural fiber and synthetic fiber on a polyester-based felt and combining the natural fiber, the synthetic fiber, and the polyester-based felt by needle punching, coating polyolefin-based powder on the low-density reinforcement sheet or combining a polyolefin-based film with the low-density reinforcement sheet, and pressing the low-density reinforcement sheet by a heat roller, and obtaining a multi-layered composite substrate by successively stacking the reinforcement layers on both surfaces of the foam sheet by heat.

As the high-density thin sheets are formed using the low-density reinforcement sheets formed of the natural fiber and the synthetic fiber, the density uniformness, humidity-resistance, and strength of the reinforcement layers may be increased. Particularly, since the polyolefin-based powder is coated or the polyolefin-based film is attached on each of the reinforcement sheets, surface tension is increased, thereby minimizing the effects of moisture and improving sagging. The composite substrate manufactured using the reinforcement layers may prevent carbonization of the natural fiber during thermal molding, decomposition, and mold growth. Further, as the multi-layered composite substrate has an improved flexural property and thus excellent shape stability, the multi-layered composite substrate may not be bent during transfer or installation in a vehicle.

1. Core Layer (Foam Sheet)

According to the present invention, a foam having a density enough to wind the foam into a roll is applicable to the foam sheet used as the core layer 100. Although a polypropylene foam is preferable for the foam sheet, a polyolefin-based foam including other polyethylene foams is also available. The polypropylene foam sheet preferably has a foam ratio of 3 to 40 times and a thickness of 1 to 15 mm. The polypropylene foam sheet is laminated in one or two layers.

2. Formation of Reinforcement Layers (Low-Density Reinforcement Sheets->High-Density Reinforcement Sheets)

According to the present invention, the reinforcement layers are formed in the following steps.

First, each of low-density thin sheets are formed by mixing a natural fiber with a synthetic fiber by carding, cross-wrapping the mixed natural fiber and synthetic fiber alone or on a polyester-based felt, and combining the natural fiber and the synthetic fiber both or together with the polyester-based felt by needle punching. To increase surface tension and improve sagging, polyolefin-based powder or a polyolefin-based film is coated on the low-density thin sheet and pressed by a heat roller. Thus, the reinforcement layers are formed in the form of high-density thin sheets.

1) Material of Reinforcement Sheets

According to the present invention, the natural fiber and the synthetic fiber are mixed at 1:9 to 9:1 for the reinforcement sheets of the reinforcement layers. The natural fiber includes kenaf, yellow hemp, sisal hemp, linen, or bamboo. The natural fiber is 40 to 80 μm thick and 40 to 80 mm long. The synthetic fiber is a mixture of one or more of a low-melting point polyester fiber, a PolyEthylene Terephthalate (PET) fiber, a nylon fiber, a polypropylene fiber, an acrylic fiber, and a biodegradable resin fiber.

Each of the reinforcement sheets is formed by subjecting the natural fiber and the synthetic fiber to carding mixing, cross wrapping, and needle punching. Only the natural fiber and the synthetic fiber may be used. Or the carding-mixed natural fiber and synthetic fiber may be cross-wrapped on a polyester-based felt having a weight per unit area of 5 g/m$^2$ to 30 g/m$^2$ and then needle-punched.

2) Low-Density Reinforcement Sheets->High-Density Thin Sheets Process

The reinforcement sheets formed in the above process have a relatively low density and thus the density is increased by means of a heat roller. The temperature of the heat roller is adjusted to 150 to 130° C. The synthetic fiber is excellent in melting infiltration within this temperature range.

Herein, a coating surface may be formed using polyolefin-based powder or a polyolefin-based film. According to the present invention, if the polyolefin-based power of 10 $gm^2$ to 100 $gm^2$ is coated on a surface of each of the low-density reinforcement sheets, the resulting increase in surface tension increases the effects of moisture and improves sagging. Even when the polyolefin-based film includes the natural fiber and the synthetic fiber, the polyolefin-based powder may be coated. However, since the polyolefin-based film and the polyolefin-based powder play similar roles, the same function may be executed without the polyolefin-based powder.

The reinforcement layers in the form of the high-density thin sheets are preferably 0.5 to 1 mm, more preferably 0.7 to 0.8 mm, thereby increasing density. Therefore, the strength and flexural property of the lightweight, multi-layered composite substrate may further be increased. According to the present invention, the reinforcement layers are formed to be thin sheets. The reinforcement layers have preferably a weight per unit area of 150 $g/m^2$ to 450 $g/m^2$, more preferably 150 $g/m^2$ to 300 $g/m^2$.

The reinforcement layers may be formed in separate steps or in separate needle punching, power coating, and heat rolling sections through continuous processing.

3. Stacking Between Core Layer (Foam Sheet) and Reinforcement Layers

The three layers of the prepared polypropylene foam sheet and the reinforcement layers are stacked continuously at the same time by heat. Therefore, a lightweight, multi-layered composite substrate for a vehicle interior material, which is excellent in terms of density uniformness, strength, humidity-resistance, and shape stability, can be manufactured.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The present invention will be described below with reference to the attached drawings.

Figure 1:
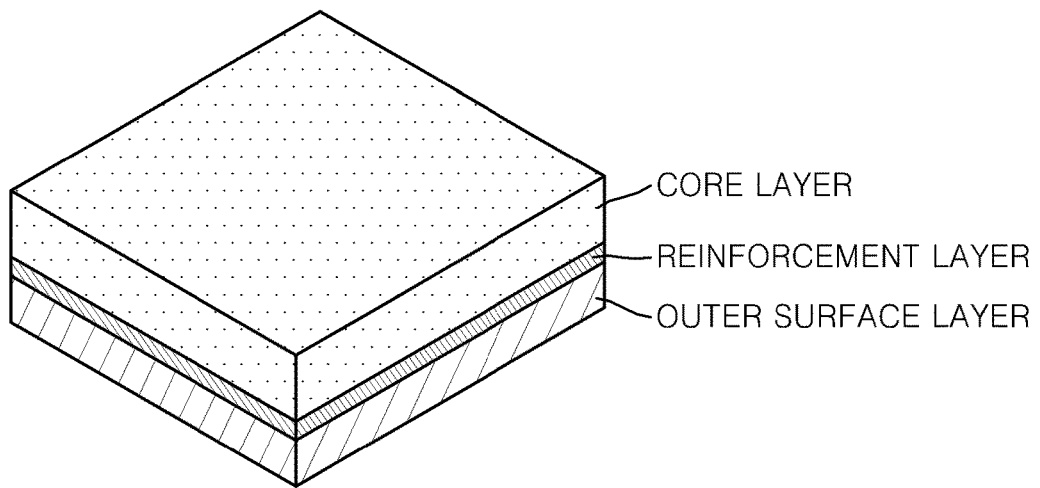
FIG. 1 is a schematic view of a conventional natural fiber-reinforced substrate structure.
Figure 2:
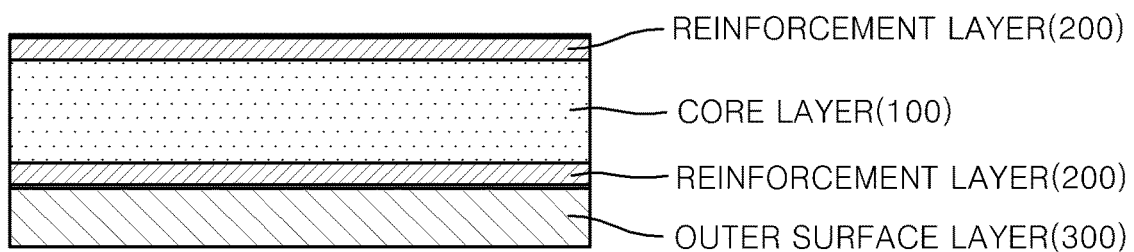
FIG. 2 is a sectional view of a lightweight, multi-layered composite substrate according to the present invention.
Figure 3:
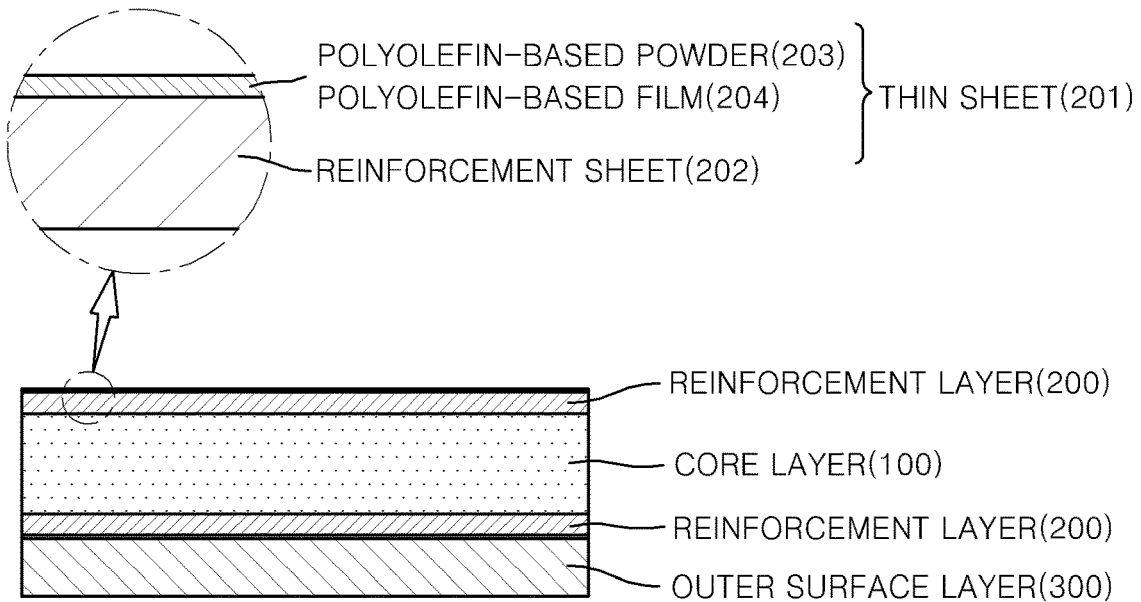
FIGS. 3 and 4 are schematic enlarged views of the lightweight, multi-layered composite substrate illustrated in FIG. 2.
Figure 4:
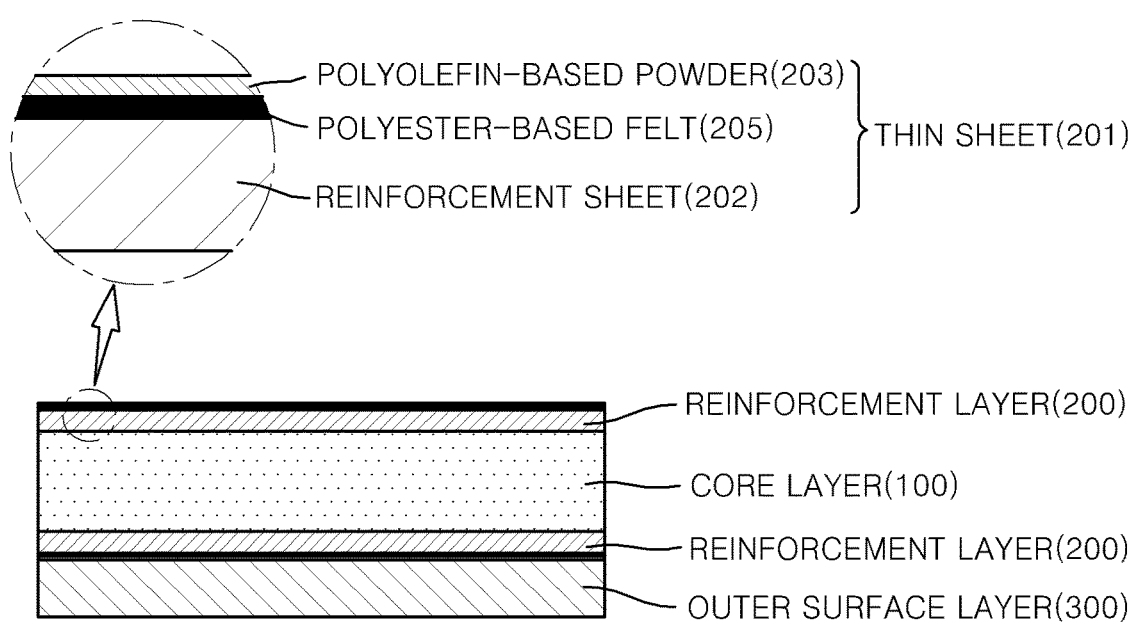

FIG. 2 is a sectional view of a lightweight, multi-layered composite substrate according to the present invention, and FIGS. 3 and 4 are schematic enlarged views of the lightweight, multi-layered composite substrate illustrated in FIG. 2.

The lightweight, multi-layered composite substrate of the present invention includes a core layer 100 being a polypropylene foam sheet and reinforcement layers 200.

The reinforcement layers 200 are stacked on both surfaces of the polypropylene foam sheet 100, thereby increasing density uniformness, strength, humidity-resistance, and shape stability of the lightweight, multi-layered composite layer.

In the process of stacking the reinforcement layers 200 on both surfaces of the core layer 100, if the core layer 100 and the reinforcement layers 200 are combined and molded by directly heating the core layer 100 and the reinforcement layers 200 in a mold, much time is taken for the combining. As a result, a natural fiber is carbonized, a synthetic fiber is shrunken, and the thickness of the foam layer is decreased excessively. In this regard, the direct heating is not effective.

According to the present invention, the light, multi-layered composite substrate is manufactured by forming continuous thin sheets 201 having density increased by means of a heat roller, as the reinforcement layers 200 and then simultaneously laminating the continuous thin sheets 201 to the polypropylene foam layer 100. Since this method increases the strength reinforcement effect of the reinforcement layers 200, a strong vehicle interior material may be achieved.

Particularly, the present invention characteristically provides a technical method for manufacturing the lightweight reinforcement layers 200 to a weight per unit area of 300 $g/m^2$ or below. As the weight of the reinforcement layers 200 decreases, a density deviation and a thickness deviation increase. The resulting degradation of properties of the composite substrate leads to a decrease in the shape stability and heat-resistant stability of the molded product. In order to maintain the properties of the composite substrate by minimizing the density deviation, a natural fiber is combined with a synthetic fiber by needle punching and then polypropylene powder 203 is coated on the combined natural and synthetic fibers and pressed by means of a heat roller. Thus the properties of the composite substrate including a flexural strength may be maintained and shrinkage of the composite substrate may be prevented during heating.

A polyester-based felt 205 or a polyolefin-based film 204, which has a weight per unit area of 5 $g/m^2$ to 30 $g/m^2$, may be combined simultaneously with the natural fiber and the synthetic fiber by needling punching and heat rolling. In general, the thermal shrinkage of a polypropylene fiber or a low-melting point polyester fiber is controlled using excellent heat-resistance of the polyester-based felt 205 having a melting point of 250° C. or above. The use of the polyolefin-based film 204 may increase density uniformness and may minimize the effects of moisture and improve sagging by increasing surface tension. Therefore, the shape stability and strength of the lightweight, multi-layered composite substrate may further be increased.

According to the present invention, the reinforcement layers 200 are formed by mixing a natural fiber with a synthetic fiber. Since the moisture absorption of the natural fiber may affect the shape stability of the composite substrate in a high-temperature, high-humidity environment, formation of a shielding film for shielding moisture is crucial to minimization of the moisture absorption of the natural fiber contained to a certain extent in the reinforcement layers 200. Thus, the present invention minimizes the effects of moisture from the natural fiber by forming a coating surface on each of the reinforcement layers 200 using the polyolefin-based powder 203 or the polyolefin-based film 204.

For each of the reinforcement layer 200, a thin sheet 201 is formed by mixing the natural fiber with the synthetic fiber and subjecting the mixed fibers to needle punching and heat rolling. As the thin sheet 201 gets thinner, the strength and flexural properties of the completed lightweight, multi-layered composite substrate become more excellent. Therefore, it is important to increase density and decrease a thickness deviation by heat rolling.

To readily impregnate the natural fiber and the synthetic fiber, a temperature and heating interval of the heat roller should be controlled appropriately. Accordingly, it is significant to select a synthetic fiber that melts at the temperature of the heat roller.

Specifically, the natural fiber and the synthetic fiber are mixed at a weight ratio of 1:9 to 9:1 in each of reinforcement sheets 202 in the fabrication process of the reinforcement layers 200 according to the present invention. The natural fiber is made from kenaf, yellow hemp, sisal hemp, cotton, etc. While the natural fiber may be 40 µm to 120 µm thick and 40 mm to 80 mm long, the type, length, and thickness of the natural fiber are not limited to any specific type, length, and thickness. The synthetic fiber may be made by mixing one or more of a low-melting point polyester, PolyEthylene Terephthalate (PET), polypropylene, acryl, a biodegradable resin fiber, etc. so that the synthetic fiber may have durability, water-resistance, corrosion-resistance, and high strength.

Further, the reinforcement layers 200 are formed by forming a coating surface using the polyolefin-based powder 203 or the polyolefin-based film 204 and increasing the impregnability of the natural fiber, so that the reinforcement layers 200 may have an increased strength and humidity-resistance.

When the lightweight, multi-layered composite substrate is used as a vehicle interior material, an outer surface layer 300 is additionally stacked on one or both surfaces of a reinforcement layer 200. The outer surface layer 300 is formed of a polyolefin-based felt or a polyester-based felt. The outer surface layer 300 may be attached to the polyolefin-based powder 203 or the polyolefin-based film 204 coated on the reinforcement layer 200 by thermal melting without a solvent adhesive or a hot-melt adhesive because the polyolefin-based powder 203 or the polyolefin-based film 204 is tacky. Therefore, the process may be simplified and an odor problem encountered with use of a conventional adhesive may be overcome.

FIGS. 3 and 4 are enlarged views of the lightweight, multi-layered composite substrate according to the present invention. The core layer 100 being a 2-layer continuous polypropylene foam sheet, the reinforcement layers 200, and the outer surface layer 300 are stacked in FIGS. 3 and 4.

While the polypropylene foam sheet being the core layer 100, the reinforcement layers 200, and the outer surface layer 300 may be stacked sequentially by heat or an adhesive, it is preferred that the reinforcement layers 200 are disposed on and under the polypropylene foam sheet and stacked by heat and pressure because the polypropylene foam sheet as the core layer 100 and the reinforcement layers 200 are formed of the same type material in the present invention.

According to the present invention, the two reinforcement layers 200 and the polypropylene foam sheet being the core layer 100 are laminated successively by heat. A laminated product experiences creases and overlapping. To avert this problem, the polypropylene foam sheet 100 and the reinforcement layers 200 are pre-heated at different temperatures, to thereby prevent creases in the present invention.

The lightweight, multi-layered composite substrate of the present invention is useful in applications of building interior materials or vehicle interior materials, in that it has an excellent flexural strength and a small sagging variation in various environments. Specifically, the flexural strength (kgf/5 cm) of the lightweight, multi-layered composite substrate (a flexural strength test is performed in conformance to ASTM D 790, the dimensions of a specimen are 50 mm×150 mm×thickness, a span length is 100 mm, and a test speed is 5 mm/min) is equal to or larger than 1.70 and 1.51 in width and length under a state condition of 23° C.×50% R.H, 1.5 and 1.29 in width and length under a heat-resistant condition that the specimen is left at 80° C. for 24 hours and then stabilized for 1 hour in the state condition, and 1.11 and 1.31 in width and length under a humidity-resistant condition that the specimen is left at 50° C.×90% R.H for 24 hours and then stabilized for 1 hour under the state condition). A sag change rate (($\%$)=(L1−K)/L×100 where L(mm) is a height before exposure and L1 (mm) is a height after exposure) of the lightweight, multi-layered composite layer is equal to or less than 5.5. With one end of a specimen with dimensions of 500 mm×200 mm×thickness fixed by a jig having an area of 70 mm and the other end of the specimen fixed by attaching a 30 mm×40 mm jig having a weight of 29 g, the sag change rate is measured by measuring an initial height L above a floor surface, leaving the specimen at a condition of 50°×90 R.H for 7 hours, and measuring a height L1 above the floor surface.

The foregoing and following descriptions are given to help understanding of the present invention. Thus, embodiments of the present invention may be modified to other forms and the scope of the present invention should not be interpreted as limited by the embodiments as set forth below.

Embodiment 1

Each of the thin sheets 201 are formed by mixing a natural fiber and a synthetic fiber at a weight ratio of 6:4 to 180 g/m$^2$ by carding, subjecting the mixed natural fiber and synthetic fiber to cross wrapping and needle punching, coating the polyolefin-based powder 203 of 50 g/m$^2$ on the natural fiber and the synthetic fiber, and heat-rolling the resulting structure by means of a heat roller set to 210° C. Then, the lightweight, multi-layered composite substrate is manufactured by stacking the thin sheets 201 on both surfaces of the polypropylene foam sheet being the core layer 100 and thermally pressing the thin sheets 201.

Embodiment 2

Each of the thin sheets 201 are formed by mixing a natural fiber and a synthetic fiber at a weight ratio of 6:4 with the polyester-based felt 205 of 30 g/m$^2$ to 150 g/m$^2$ by carding, subjecting the mixed natural fiber, synthetic fiber, and polyester-based felt 205 to cross wrapping and needle punching, coating the polyolefin-based powder 203 of 50 g/m$^2$ on the natural fiber, the synthetic fiber, and the polyester-based felt 205, and heat-rolling the resulting structure by means of a heat roller set to 210° C. Then, the lightweight, multi-layered composite substrate is manufactured by stacking the thin sheets 201 on both surfaces of the polypropylene foam sheet being the core layer 100 by heat.

Embodiment 3

Each of the thin sheets 201 are formed by mixing a natural fiber and a synthetic fiber at a weight ratio of 6:4 with the polyolefin-based film 204 of 100 g/m² to 130 g/m² by carding, subjecting the mixed natural fiber, synthetic fiber, and polyolefin-based film 204 to cross wrapping and needle punching, and heat-rolling the resulting structure by means of a heat roller set to 220° C. Then, the lightweight, multi-layered composite substrate is manufactured by stacking the thin sheets 201 on both surfaces of the polypropylene foam sheet being the core layer 100 by heat.

Comparison Example 1

The reinforcement sheets are stacked on both surfaces of the core layer 100 being the polypropylene foam sheet by heat in the same manner as Embodiment 1, Embodiment 2, and Embodiment 3, except that none of the polyester-based felt 205, the polyolefin-based film 204, and the polyolefin-based powder 203 are used.

[Table 1] below lists flexural strengths measured from specimens formed according to Embodiment 1, Embodiment 2, Embodiment 3, and Comparison Example 1 under a state condition, a heat-resistant condition, and an humidity-resistant condition, and sag change rates measured from the specimens under the humidity-resistant condition.

A comparison between Embodiment 1, Embodiment 2, and Embodiment 3, and Comparison Example 1 reveals that the lightweight, multi-layered composite substrate of the present invention has an increased flexural strength, strength, and humidity-resistance under the state condition, the heat-resistant condition, and the humidity-resistant condition. Due to the use of the polyolefin-based powder 203 or the polyolefin-based film 204, the coating effect and surface tension of the natural fiber are increased. The resulting improvement of the humidity-resistance leads to a remarkable improvement in sagging in a sagging test after a humidity-resistance test.

A flexural strength test is performed in conformance to ASTM D 790, the dimensions of a specimen are 50 mm×150 mm×thickness, a span length is 100 mm, and a test speed is 5 mm/min. The state condition is 23° C.×50% R.H, the heat-resistant condition is that the specimen is left at 80° C. for hours and then stabilized for 1 hour in the state condition, and the humidity-resistant condition is that the specimen is left at 50° C.×90% R.H for 24 hours and then stabilized for 1 hour under the state condition).

In a sagging test, with one end of a specimen with dimensions of 500 mm×200 mm×thickness fixed by a jig having an area of 70 mm and the other end of the specimen fixed by attaching a 30 mm×40 mm jig having a weight of 29 g, a sag change rate is measured by measuring an initial height L above a floor surface, leaving the specimen at a condition of 50°×90 R.H for 7 hours, and measuring a height L1 above the floor surface.

TABLE 1

| | | | Embodiment 1 | Embodiment 2 | Embodiment 3 | Comparison Example 1 |
|---|---|---|---|---|---|---|
| PP FOAM | | | 25 times/ 4.5 mm, 180 g/m² | 25 times/ 4.5 mm, 180 g/m² | 25 times/ 4.5 mm, 180 g/m² | 25 times/ 4.5 mm, 180 g/m² |
| Natural fiber and synthetic fiber (4:6) | | | 180 g/m² | 150 g/m² | 130 g/m² | 230 g/m² |
| Polyester-based felt | | | — | 30 g/m² | — | — |
| Polyolefin-based powder | | | 50 g/m² | 50 g/m² | — | — |
| Polyolefin-based film | | | — | — | 100 g/m² | — |
| Net weight (g/m²) | | | 658 | 655 | 651 | 652 |
| thickness (mm) | | | 5.9 | 6.1 | 6.2 | 5.8 |
| Flexural strength (kgf/5 cm) | state | length | 1.70 | 1.83 | 1.90 | 1.60 |
| | | Width | 1.51 | 1.58 | 1.51 | 1.26 |
| | Heat-resistance | Length | 1.58 | 1.70 | 1.78 | 1.42 |
| | | Width | 1.29 | 1.41 | 1.41 | 1.24 |
| | Humidity-resistance | Length | 1.31 | 1.48 | 1.54 | 1.12 |
| | | Width | 1.11 | 1.32 | 1.42 | 1.06 |
| Sagging change rate (%) | | | 5.5 | 3.5 | 3.5 | 11.5 |

As is apparent from the above description of the present invention, since a polypropylene foam sheet is used as a core layer and reinforcement layers are stacked on both surfaces of the polypropylene foam sheet, a lightweight, multi-layered composite substrate can be manufactured in a simplified process, compared to a conventional manufacturing process using a polyolefin-based foam, a polyurethane-based foam, or an Expanded PolyPropylene (EPP) foam. Consequently, manufacture cost can be reduced. Further, as an adhesive is not used for the lightweight, multi-layered composite substrate, the lightweight, multi-layered composite substrate is not harmful to the human body.

The density uniformness of the lightweight, multi-layered composite substrate is increased by subjecting a synthetic fiber with high durability, water-proofness, and strength and an ecofriendly natural fiber, both or in combination with a polyester-based felt, to needle punching and heat rolling. In addition, polyolefin-based powder or a polyolefin-based film is used for the reinforcement layers to increase surface tension and improve sagging. Therefore, the lightweight, multi-layered composite substrate has a high flexural strength, is robust against external impacts and changes in temperature and humidity, and is ecofriendly.

Since a process of pre-heating the polypropylene foam sheet being the core layer and the reinforcement layers at different temperatures is added, creasing and overlapping can be reduced during thermal lamination.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for manufacturing a lightweight, multi-layered composite substrate including a core layer being a foam sheet and reinforcement layers stacked on both surfaces of the core layer, the method comprising:

preparing the foam sheet;

forming each of the reinforcement layers by forming a low-density reinforcement sheet by mixing a natural fiber with a synthetic fiber by carding, subjecting the mixed natural fiber and synthetic fiber to cross wrapping and needle punching, coating polyolefin-based powder to a weight per unit area of 10 g/m$^2$ to 100 g/m$^2$ on the low-density reinforcement sheet, and pressing the low-density reinforcement sheet by a heat roller set to 150 to 230° C.; and obtaining a multi-layered composite substrate by stacking the reinforcement layers on both surfaces of the foam sheet by heat.

2. The method according to claim 1, wherein the low-density reinforcement sheet has a thickness of 4.0 to 6.0 mm and a weight per unit area of 50 g/m$^2$ to 450 g/m$^2$, and each of the reinforcement layers has a thickness of 0.5 to 1 mm and a weight per unit area of 150 g/m$^2$ to 450 g/m$^2$.

3. The method according to claim 2, wherein each of the reinforcement layers has a thickness of 0.7 to 0.8 mm and a weight per unit area of 150 g/m$^2$ to 300 g/m$^2$.

4. The method according to claim 1, wherein the natural fiber includes a vegetable fiber.

5. The method according to claim 4, wherein the vegetable fiber includes one of yellow hemp, kenaf, sisal hemp, linen, and bamboo.

6. The method according to claim 1, wherein the synthetic fiber is a mixture of one or more of a low-melting point polyester fiber, a PolyEthylene Terephthalate (PET) fiber, a nylon fiber, a polypropylene fiber, an acrylic fiber, and a biodegradable resin fiber.

7. The method according to claim 1, wherein the foam sheet is a polypropylene-based continuous sheet foam that has a foaming ratio of 3 to 40 times and a thickness of 1 to 15 mm and is windable into a roll.

8. A method for manufacturing a lightweight, multi-layered composite substrate including a core layer being a foam sheet and reinforcement layers stacked on both surfaces of the core layer, the method comprising:

preparing the foam sheet;

forming each of the reinforcement layers by forming a low-density reinforcement sheet by mixing a natural fiber with a synthetic fiber by carding, cross-wrapping the mixed natural fiber and synthetic fiber on a polyester-based felt, and combining the natural fiber and the synthetic fiber with the polyester-based felt by needle punching, coating polyolefin-based powder to a weight per unit area of 10 g/m$^2$ to 100 g/m$^2$ on a surface of the polyester-based felt of the low-density reinforcement sheet, and pressing the low-density reinforcement sheet by a heat roller set to 150 to 230° C.; and obtaining a multi-layered composite substrate by stacking the reinforcement layers on both surfaces of the foam sheet.

9. The method according to claim 8, wherein the polyester-based felt has a weight per unit area of 5 g/m$^2$ to 30 g/m$^2$, and each of the reinforcement layers has a thickness of 0.5 to 1 mm and a weight per unit area of 150 g/m$^2$ to 450 g/m$^2$.

10. The method according to claim 9, wherein each of the reinforcement layers has a thickness of 0.7 to 0.8 mm and a weight per unit area of 150 g/m$^2$ to 300 g/m$^2$.

11. The method according to claim 8, wherein the foam sheet is a polypropylene-based continuous sheet foam that has a foaming ratio of 3 to 40 times and a thickness of 1 to 15 mm and is windable into a roll.

12. A method for manufacturing a lightweight, multi-layered composite substrate including a core layer being a foam sheet and reinforcement layers stacked on both surfaces of the core layer, the method comprising:

preparing the foam sheet;

forming each of the reinforcement layers by forming a low-density reinforcement sheet by mixing a natural fiber with a synthetic fiber by carding, cross-wrapping the mixed natural fiber and synthetic fiber, and combining the natural fiber and the synthetic fiber by needle punching, combining a polyolefin-based film with the low-density reinforcement sheet before or after the needle punching, and pressing the low-density reinforcement sheet by a heat roller set to 150 to 230° C.; and obtaining a multi-layered composite substrate by stacking the reinforcement layers on both surfaces of the foam sheet.

13. The method according to claim 12, wherein the polyolefin-based film has a weight per unit area of 50 g/m$^2$ to 130 g/m$^2$, and each of the reinforcement layers has a thickness of 0.5 to 1 mm and a weight per unit area of 150 g/m$^2$ to 450 g/m$^2$.

14. The method according to claim 13, wherein each of the reinforcement layers has a thickness of 0.7 to 0.8 mm and a weight per unit area of 150 g/m$^2$ to 300 g/m$^2$.

15. The method according to claim 14, wherein the foam sheet is a polypropylene-based continuous sheet foam that has a foaming ratio of 3 to 40 times and a thickness of 1 to 15 mm and is windable into a roll.

* * * * *